United States Patent [19]

Spitzer et al.

[11] 4,106,730
[45] Aug. 15, 1978

[54] ENGINE OUT CONTROL SYSTEM FOR STOL AIRCRAFT

[75] Inventors: Robert E. Spitzer, Seattle; Fred W. May, III, Bellevue, both of Wash.

[73] Assignee: The Boeing Company, Seattle, Wash.

[21] Appl. No.: 728,742

[22] Filed: Oct. 1, 1976

[51] Int. Cl.² .............................................. G05D 1/12
[52] U.S. Cl. ..................................... 244/183; 244/182
[58] Field of Search ............ 60/39.15, 39.28 R, 39.29; 73/117.4, 178 R, 178 T; 235/150.21, 150.2; 244/42 R, 42 A, 42 CB, 42 CD, 42 D, 42 DA, 42 DB, 53 R, 76 R, 76 A, 76 B, 175, 178, 182–188, 201, 203, 212, 213, 215, 216; 340/27 SS

[56] References Cited

U.S. PATENT DOCUMENTS

| 2,158,676 | 5/1939 | Engelhardt ...................... 244/42 DB |
| 2,176,817 | 10/1939 | Jacobson et al. .............. 244/76 B X |
| 2,342,184 | 2/1944 | Fawcett ............................. 244/76 B |
| 2,350,751 | 6/1944 | Gliubich ......................... 244/182 X |
| 2,448,167 | 8/1948 | Baak .................................. 244/182 X |
| 2,532,469 | 12/1950 | Trautman ...................... 244/42 R X |
| 3,813,063 | 5/1974 | Martin ................................. 244/182 |
| 3,837,601 | 9/1974 | Cole ................................ 244/42 DB |
| 3,977,630 | 8/1976 | Lewis et al. .................... 244/42 DB |
| 3,987,983 | 10/1976 | Cole ................................ 244/42 DB |

FOREIGN PATENT DOCUMENTS

332,892  7/1930  United Kingdom .................. 244/42 R

OTHER PUBLICATIONS

R. L. McPherson, "A Pilot's View of the YC-14 Airplane", SETP 1975 Report to the Aerospace Profession XIX, vol. 12, No. 4, pp. 99-116, 9-24-1975.
R. A. Curnett et al., "Electronic Systems Contribution to YC-14 Performance", IEEE 1975 Electronics and Aerospace Conference, pp. 199-200-I, 10-1-1975.
R. E. Spitzer, "Use of the Flight Simulator in YC-14 Design", 1975 AGARD Conference Proceedings No. 198, pp. 7-1 to 7-14, Jun. 1976.

*Primary Examiner*—Stephen G. Kunin
*Attorney, Agent, or Firm*—Christensen, O'Connor, Johnson & Kindness

[57] ABSTRACT

A control system for automatically activating the flight control surfaces of a STOL aircraft that utilizes upper surface blown flaps when the aircraft executes a STOL landing or takeoff maneuver with one engine inoperative in that the engine does not provide the desired or scheduled amount of thrust. The system monitors internal engine pressure of each engine to detect such engine failure and deploys the upper surface blown flaps, conventional flaps and spoilers used as direct lift control devices to provide a relatively uniform lift distribution across the aircraft wing and hence lower induced drag. When the aircraft executes a STOL takeoff procedure with an engine, that does not provide the proper thrust level the upper surface blown flap located aft of that engine is automatically extended to a position that matches the position of those conventional flaps located outboard of the inoperative engine. Closable spanwise slots in the extended upper surface blown flap are opened to cause the upper surface blown flap to effectively function as a conventional slotted flap. During a STOL landing maneuver with an inoperative engine, the system automatically extends the upper surface blown flap located aft of the inoperative engine, opens the spanwise slots in the extended upper surface blown flaps, and compensates for roll moment caused by the inoperative engine by partially retracting the conventional flaps of the wing not including the inoperative engine. Additionally, if the spoilers are being extended as direct lift control devices, the system retracts the spoilers to further reduce drag and flatten the glide path angle.

23 Claims, 12 Drawing Figures

ENGINE OUT CONTROL SYSTEM FOR STOL AIRCRAFT

BACKGROUND OF THE INVENTION

This invention relates to short takeoff and landing aircraft, more particularly this invention relates to an automatic control system for enabling a short takeoff and landing aircraft to safely execute takeoff and landing procedures with one engine inoperative.

Several United States patent applications are related to the subject matter disclosed herein. They include Lewis et al., Ser. No. 339,734, filed Mar. 9, 1973, filed as a continuing, copending application Ser. No. 520,674, on Nov. 4, 1974; and now U.S. Pat. No. 3,977,630; Cole et al., Ser. No. 339,645, filed Mar. 9, 1973, now U.S. Pat. No. 3,837,601; and, Cole, Ser. No. 534,828, filed Dec. 18, 1974, and now U.S. Pat. No. 3,987,983 all of which are expressly incorporated herein by reference.

In the majority of presently proposed short takeoff and landing (STOL) aircraft, the aircraft is equipped with deployable control surfaces such as specially configured trailing edge flaps which can be deployed during STOL procedures to substantially increase the aircraft lift coefficient. During other flight regimes, such as cruise, these control surfaces are generally deployed in a manner which essentially places the aircraft in a more or less conventional aerodynamic configuration. In one type of STOL aircraft, which is particularly suited to the practice of this invention, augmentation of the aerodynamic lift that is supplied by the flow of the ambient air over the wing is effected by a technique identified as upper surface blowing (USB). In an aircraft utilizing upper surface blowing, the aircraft engines are mounted forwardly of and above the wings to discharge their exhaust stream chordwise across the upper airfoil surface of the wing. During normal flight, the exhaust stream is directed rearwardly to substantially generate forward thrust in a conventional manner. During STOL maneuvers, a type of trailing edge flaps, denoted herein as upper surface blown (USB) flaps, are employed to increase the camber and chord of the wing and at the same time form a continuously curved, downward and rearward extension of the upper airfoil surface of the wing. When the USB flaps are so extended, the exhaust stream traveling chordwise over the the upper airfoil surface of the wing attaches itself by the Coanda effect to the downwardly and rearwardly curved surface to divert the exhaust stream downwardly and rearwardly. In this manner, a lift component, as well as a forward thrust component, is generated by the exhaust stream. The engine-generated lift component augments the conventional aerodynamic lift created by ambient airflow over the remaining portion of the wing to provide a STOL capability.

As disclosed in the previously referenced copending applications, a serious problem is encountered when a STOL aircraft attempts to undertake a STOL landing or takeoff maneuver with one of the engines in an inoperative state, especially if loss of thrust occurs while the aircraft is engaged in the STOL maneuver. When this occurs, not only is the engine-generated forward thrust that is normally supplied by the inoperative engine lost, but the lifting force produced by flow turning over the USB flap is also lost. It should be noted that the terms "inoperative engine", "engine-out", and "engine failure", as utilized herein, are not limited to engine failure conditions under which an engine produces no thrust whatsoever. Specifically, as utilized herein, these terms encompass engine malfunctions in which an engine supplies an amount of thrust that is less than the amount selected by the aircraft commander or by an automatic flight control system, such lesser amount of thrust causing degradation of aircraft performance to the extent that short take off and landing maneuvers would be difficult to perform or even impractical.

USB flaps for partially alleviating the loss of lift caused by an inoperative engine by restoring some aerodynamic lift are disclosed in the aforementioned applications. These USB flaps generally comprise apparatus for reconfiguring the USB flap to a configuration that corresponds to that of a conventional slotted flap arrangement such as those used on many commercial aircraft to produce mechanical lift. In particular, each of the aforementioned applications disclose USB flaps wherein spanwise slots can be opened during an engine out condition such that ambient air can pass through the slots and produce mechanical lift to partially replace the lost engine-generated lift.

Although the USB flaps disclosed in the previously mentioned applications are operable to partially replace the loss of engine-generated lift, the use of such a flap alone often is not a satisfactory solution to the problem. First, it should be recognized that during a takeoff or landing procedure, the aircraft flight crew is performing under a substantial workload. Accordingly, it is desirable to restrict additional procedures to a minimum to thereby ensure the safety of the aircraft. Secondly, it should be recognized that under some engine failure conditions, little time is available for the aircraft commander to react. For example, if an engine fails while executing a short distance takeoff procedure, the aircraft commander may have less than 10 seconds to execute the control actions that are necessary in order for the aircraft to clear the end of the runway.

In addition to the problems that arise due to the physical limitations of the aircraft crew, the use of a USB flap without taking other appropriate control action does not place the aircraft in a desirable aerodynamic configuration. In particular, even though a portion of the engine-generated lift is restored by the spanwise slots that are opened in the USB flap, the distribution of lift across the upper surface of the aircraft wing will not be symmetrical and the airplane will have a tendency to roll. Although the aircraft commander could actuate various control surfaces, such as conventional spoilers or ailerons to reduce this rolling moment, such action not only increases crew workload but calls for judicious selection and operation of the proper control surfaces. In particular, less than optimal actuation of the control surfaces to alleviate the roll moment can cause a further increase in drag which can cause the aircraft to suffer a further loss in forward velocity or deteriorate flight path performance.

Accordingly, it is an object of this invention to provide a control system for automatically activating the control surfaces of a STOL aircraft to enable the aircraft to perform STOL maneuvers with an inoperative engine.

It is a further object of this invention to provide such a control system that does not substantially increase the workload placed on the aircraft commander, essentially allowing him to execute STOL procedures in the same manner regardless whether all engines are operative.

SUMMARY OF THE INVENTION

These and other objects are achieved in accordance with this invention by a control system which monitors engine operation and the position of both the USB and conventional flaps to detect whether an engine has failed and to detect whether the aircraft is executing a STOL maneuver. When an engine has failed and the aircraft executes a STOL procedure, the control system automatically activates the aircraft control surfaces to aerodynamically configure the aircraft so as to reduce both drag and rolling moment while increasing lift by opening spanwise slots in the USB flap located aft of the inoperative engine.

In particular, when a short distance landing is being executed with an inoperative engine, or an engine fails during such a procedure, the control system actuates the slots of the USB flap located behind the inoperative engine and positions that USB flap to correspond to the position of these conventional flaps located on the wing including the inoperative engine. To balance the roll moment caused by the engine failure, in a manner which minimizes drag, the control system automatically positions the conventional flaps located on the aircraft wing which does not include the inoperative engine (the fully powered wing). When the invention is embodied in STOL aircraft wherein spoilers are utilized as direct lift control devices during STOL landings, the control system additionally retracts the direct lift control spoilers to decrease drag.

When a short distance takeoff procedure is executed with an inoperative engine, or an engine fails during the execution of such a procedure, the control system extends the USB flap located behind the inoperative engine to a position corresponding to the position of the conventional flaps located on that wing and opens the spanwise slots of the deployed USB flap. During either control procedure the control surfaces are actuated at a rate which rapidly reconfigures the aircraft to permit execution of the STOL maneuver while simultaneously permitting the pilot to operate the aircraft controls in substantially the same manner as such controls would be activated during a corresponding full powered STOL procedure. Thus, the automatic operation of the control system and the conventional operation of the aircraft effectively function in conjunction with one another to provide optimal performance when one of the aircraft engines fails to operate properly.

The disclosed embodiment of the invention includes a digital flight control unit which performs logic operations to determine the appropriate control action and supplies signals for activating the appropriate control surfaces. To detect an engine failure, electrical signals are supplied to the flight control computer by pressure sensors located within each engine. The signals supplied from each engine are compared with a predetermined minimum thrust level and the difference between the pressure signals are compared to a pressure threshold to determine which engine, if any, is inoperative. To prevent spurious low pressures which can occur within an operating engine from causing a false indication of engine failure, the system is arranged such that a failed condition is not declared unless the condition exists for a predetermined time period.

Input signals supplied by the aircraft air data system (e.g., aircraft velocity) and flap position sensors which indicate the positions of the USB and conventional flaps are utilized to detect whether the aircraft is executing a STOL procedure and to determine the appropriate control action to be taken. Depending upon whether the aircraft is executing a takeoff or landing procedure, the flight control unit supplies signals to activate flap control servo actuators of the USB flaps and the conventional flaps, to activate the actuator for retracting the direct lift control spoilers and to activate a flap trim servo actuator for positioning the conventional flaps of the powered wing.

BRIEF DESCRIPTION OF THE DRAWINGS

A better understanding of the present invention can be derived by reading the ensuing specification in conjunction with the accompanying drawings wherein.

DETAILED DESCRIPTION

Figure 1:
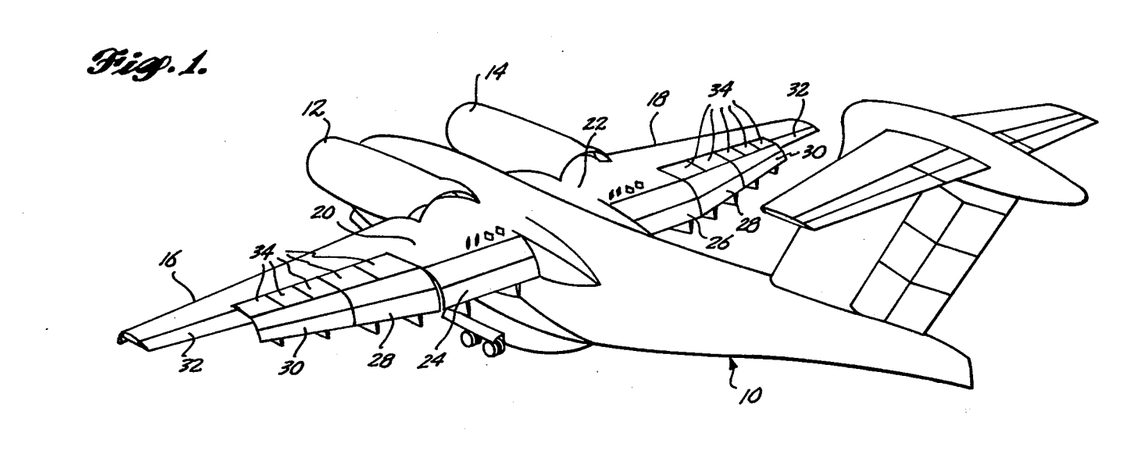
FIG. 1 is an isometric view of a twin engine STOL aircraft which can advantageously employ the present invention.

FIG. 1 depicts a twin engine STOL aircraft 10 which can advantageously employ the control system of this invention. Although the aircraft of FIG. 1 utilizes upper surface blowing to effect lift augmentation, it will be realized upon understanding the invention that the control system of this invention can be suitably embodied for use in various STOL aircraft of the powered lift variety.

In FIG. 1, gas turbine engines 12 and 14 are respectively mounted forwardly and above the wings 16 and 18 to direct exhaust gasses rearwardly across a portion of the upper surfaces 20 and 22 of the wings 16 and 18 and across the upper surface of upper surface blown (USB) flaps 24 and 26 which are respectively mounted to the rear portion of the wings 16 and 18 at a position aft of the engines 12 and 14. In accordance with this invention, the USB flaps 24 and 26 are of the type disclosed in the previously referenced patent applications wherein the USB flaps are extendable during normal STOL operation to form a downwardly and rearwardly extending, continuous, upper surface for turning the exhaust stream supplied by engines 12 and 14 and are arranged to provide open spanwise slots during operation of the aircraft when one engine has failed, i.e., fails to provide the selected level of thrust. Since each of the USB flap arrangements disclosed in the aforementioned patent applications, which are incorporated by reference herein, can be utilized in the present invention without modification, a full description of the detailed structure of the USB flaps 24 and 26 will not be undertaken herein.

A pair of conventional slotted flaps 28 and 30 are mounted along the rear of the wings 16 and 18 at a position outboard of each USB flap 24 and 26. More explicitly, each flap 28, herein referred to as a center flap, extends spanwise from a position adjacent a USB flap (24 or 26) to an inboard edge of an outboard flap 30, with each outboard flap 30 extending spanwise along the wing to the inboard edge of an aileron 32. Preferably, the center flaps 28 and outboard flaps 30 are of the well-known double slotted configuration designed to provide mechanical lift when the flaps 28 and 30 are extended and ambient air passes through the spanwise slots located therein.

The ailerons 32 can be of conventional design and are generally utilized in conjunction with spoilers 34 to effect lateral control of the aircraft 10. In the STOL aircraft 10 of FIG. 1, five spoiler panels 34 are located in the upper surfaces 20 and 22 of the wings 16 and 18, at a position forward of the center flaps 28 and outboard flaps 30. Spoilers 34 are of conventional design although various other arrangements of spoilers can be utilized by aircraft employing this invention. In addition to being utilized as a lateral control surface during normal flight and as speed brakes, in one embodiment of the STOL aircraft 10, spoilers 34 can be utilized to provide direct lift control. In particular, in STOL landing approaches in which the center flaps 28 and outboard flaps 30 are fully extended, each spoiler 34 is deployed to project upwardly from the upper surfaces 20 and 22 of the wings 16 and 18 to provide additional lift.

Figure 2A:
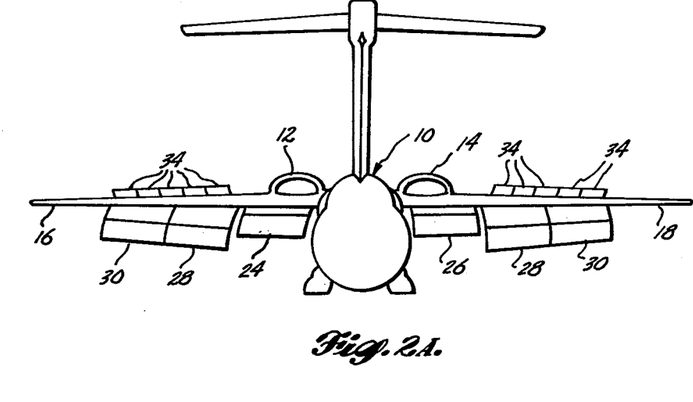
FIGS 2a and 2b are rear views of the aircraft of FIG. 1, respectively depicting the deployment of the flight control surfaces during a normal, full power STOL landing procedure and the deployment of the flight control surfaces effected by this invention during a STOL landing with an inoperative engine.
Figure 2B:
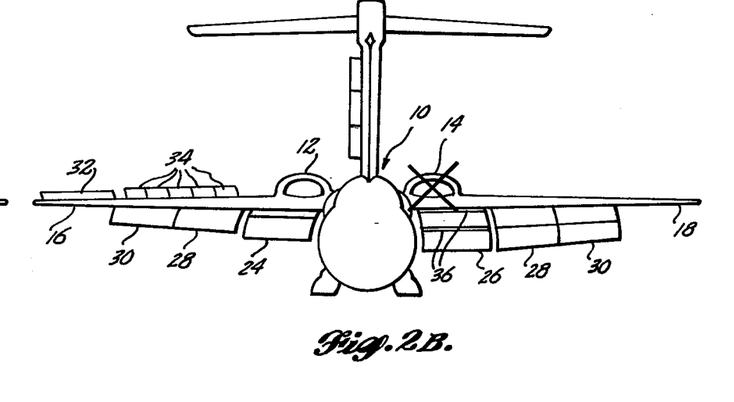

The operation of the USB flaps 24 and 26, the conventional slotted flaps 28 and 30, and the spoilers 34 by the control system of this invention during a STOL landing approach is illustrated in FIGS. 2a and 2b. In FIG. 2a, which depicts the configuration of the aircraft 10 during a normal STOL approach in which both engines 12 and 14 are operating, the flaps 28 and 30 are fully deployed in a manner generally employed in conventional aircraft. USB flaps 24 and 26 are partially extended, e.g., to an angle within the range of 35° to 60°, and the USB flaps are modulated or varied in angle of extension by the aircraft commander or by an automatic flight control system. Such modulation of the USB flaps, used in combination with changes in the thrust or throttle settings of the engines 12 and 14, controls the vectored thrust supplied by the USB flaps 24 and 26 so as to control both aircraft velocity and lift. In one embodiment of the depicted STOL aircraft, both the flap modulation and throttle settings are established by a flight control system which enables the aircraft commander to select a desired approach velocity. The flight control system then operates the engine throttles and USB flaps so as to maintain the selected approach velocity as the aircraft commander controls the aircraft 10 along the desired descent path or glide slope.

FIG. 2b depicts the deployment of the USB flaps 24 and 26, the center and outboard flaps 28 and 30, and the spoilers 34 when the engine 14 fails to provide the desired amount of thrust prior to or during the execution of a STOL landing procedure. In FIG. 2b, the USB flap 26 is extended to a position that corresponds to the position of the adjacent center flap 28 and slots, generally denoted as 36, are opened to effectively convert the USB flap 26 to a conventional double slotted flap arrangement. As described in the previously referenced applications, the opening of slots 36 is accomplished by operating an actuator mechanism which can be a conventional hydraulic, pneumatic or electrical mechanism. As ambient air passes through the slots 36 lift is produced to partially replace the loss of powered lift that is normally supplied when the exhaust stream from engine 14 is discharged over the partially extended USB flap 26.

Simply extending the USB flap behind the inoperative engine does not provide the most advantageous aerodynamic configuration under engine failure conditions. Although such a procedure may allow an essentially normal STOL landing under conditions in which the aircraft is positioned on the proper glide path when the engine fails and under conditions wherein it is not necessary to undertake a go-around maneuver to attempt another landing, it can be easily recognized that maximum flight path performance should be provided to enable the aircraft commander to safely maneuver the aircraft under all flight conditions. In this respect, the control system of this invention automatically retracts the spoilers 34 if they are being deployed as direct lift control devices and automatically partially retracts the flaps 28 and 30 of the powered wing, (i.e., the wing 16 in FIG. 2b).

Automatically retracting the spoilers 34 causes a glide path flattening to counteract the steepening in glide path angle which would normally be caused by the engine failure and reduced drag on the aircraft which would cause loss in air speed and a further increase in glide path angle. Partially retracting the flaps 28 and 30 of the wing that includes the operative engine (wing 16 of FIG. 2b), reduces the lift of powered wing to balance a rolling moment which would otherwise be caused by the inoperative engine. As shall be described relative to FIG. 6, it has been found that retraction of flaps 28 and 30 of the powered wing is best accomplished as a function of aircraft velocity with no flap trim being utilized should the aircraft undertake a go around procedure.

With the above-described activation of the USB flap 26, spoilers 34 and flaps 28 and 30, and remaining roll moment is compensated by manual, lateral control means. For example, in FIG. 2b, the aileron 32 and the spoilers 34 of wing 16 are partially activated to provide the necessary lateral control action. It will be recognized by those skilled in the art that, under most conditions, the aileron 32 and spoilers 34 of the powered wing could be utilized to provide the necessary lateral control to offset the rolling moment caused by the inoperative engine without partial retraction of the flaps 28 and 30. It will be further recognized however that such a procedure further increases aircraft drag and thus is not as advantageous as the action taken by the control system of this invention. In this respect, it has been determined that, in one particular aircraft in which the invention is employed, the control system of this invention enables the aircraft to attain level flight during a STOL landing if necessary, further permitting a positive climb gradient without an increase in aircraft air speed should a go-around procedure be necessary.

Figure 3A:
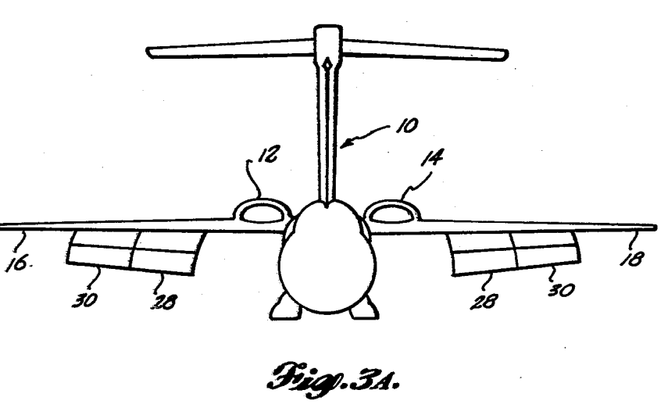
FIGS. 3a and 3b are rear views of the aircraft of FIG. 1 respectively depicting deployment of the aircraft control surfaces during a normal, full powered takeoff procedure and the deployment of the aircraft control surfaces effected by this invention during a STOL takeoff procedure with an inoperative engine.
Figure 3B:
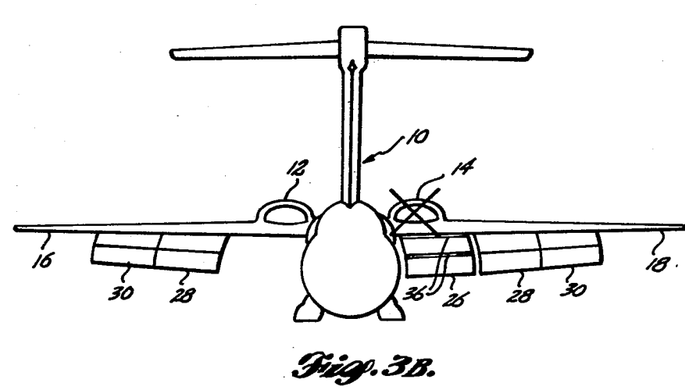

Referring to FIGS. 3a and 3b, the operation of this invention when an engine fails during or prior to a STOL takeoff procedure can be ascertained. As shown in FIG. 2a, during a normal STOL takeoff operation when both engines 12 and 14 are fully operative, the slaps 28 and 30 of each wing 16 and 18 are deployed in a conventional manner to provide lift. In the particular aircraft which is depicted in FIG. 3a, USB flaps 24 and 26 are not partially extended to provide additional lift during the takeoff procedure since this particular aircraft provides adequate thrust vectoring (lift) to accomplish a STOL takeoff with the USB flaps fully retracted. Although it should be recognized that other aircraft suitable for the practice of this invention may utilize extended lift augmentation flaps such as USB flaps 24 and 26 during the takeoff maneuver, operation of the present invention would remain essentially as described herein.

As shown in FIG. 2b, which depicts the STOL takeoff configuration with the engine 14 having failed prior to or during a STOL takeoff procedure, the USB flap 26 which is located behind the inoperative engine 14 is extended to the same position as the adjacent flaps 28 and 30. As in the STOL landing procedure with an inoperative engine, slots 36 of the extended USB flap are open to provide lift which partially compensates for lift normally provided by the flow of the exhaust stream of engine 14 across the wing 18.

The previously described operation of the control system of this invention is effected so that the manual control necessary to accomplish the desired maneuver is substantially the same as would be experienced when both engines are fully operational. Yet, operation of the present invention is rapid enough to provide STOL takeoff capability when an engine fails as the aircraft is in the process of executing a STOL takeoff. In this respect, it has been determined that total system operation times on the order of less than 10 seconds are generally satisfactory. For example, in the situation in which the invention is embodied in the previously referred to aircraft, an operation time of approximately 7 seconds is utilized with 1 second being allotted to the detection of the engine out condition, and 6 seconds being utilized for properly positioning the control surfaces. In this embodiment, the USB flaps are hydraulically actuated between extension angles of 0° and 70° and can be moved at a rate of 10° per second.

Figure 4:
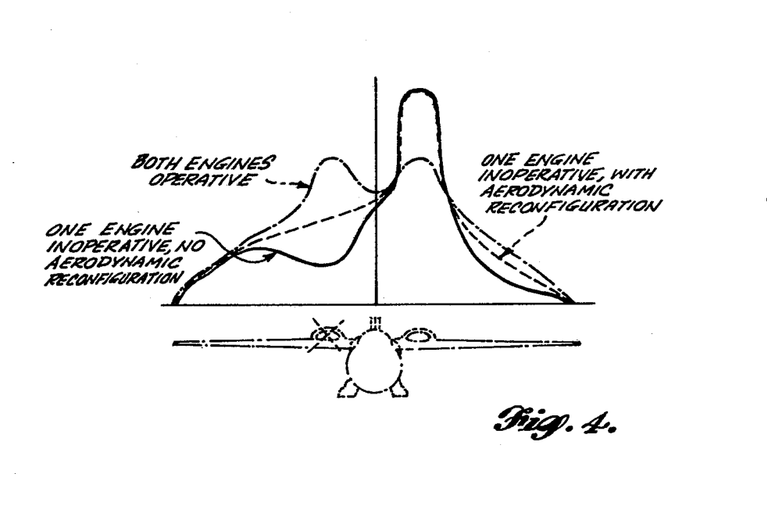
FIG. 4 is a graphic representation of the lift distribution across the upper surface of the aircraft wing which illustrates the asymmetric lift distribution normally present with an inoperative engine and illustrates the substantially more symmetrical lift distribution achieved by the operation of the present invention.

FIG. 4 graphically depicts the distribution of lift across the wings 16 and 18 during a STOL landing procedure with both engines inoperative, with one engine inoperative without the redistribution of lift effected by this invention, and with one engine inoperative and the aircraft configured as described above to redistribute the lift.

Figure 5:
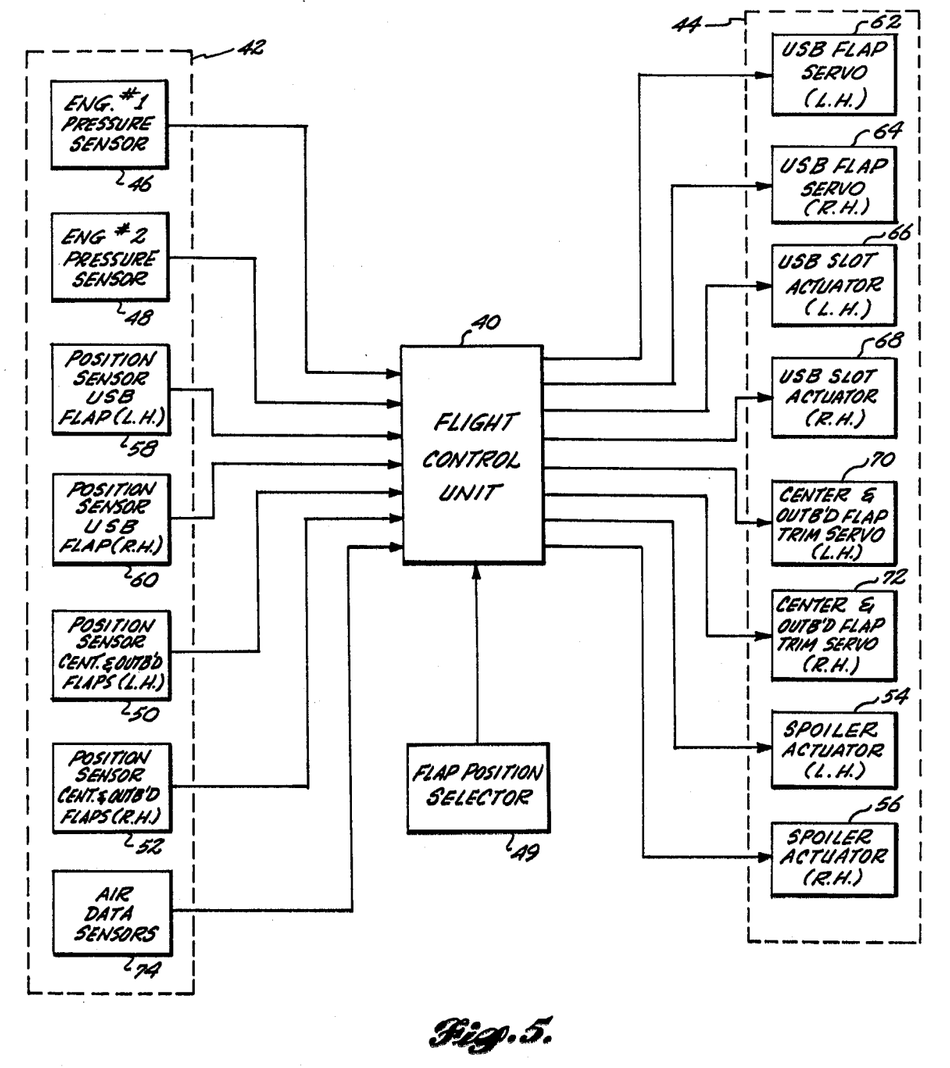
FIG. 5 is a block diagram illustrating an embodiment of the present invention.

Referring to the block diagram of FIG. 5, the control system of this invention includes a flight control unit 40 interconnected with a plurality of signaled input devices enclosed with the dashed outline 42 and a plurality of actuators shown within the dashed outline 44. As will be understood from the following description, the flight control unit 40 is effectively a digital processing unit and can be a programmable digital computer, a wired microprocessor unit, or an arrangement of digital logic circuitry for effecting the operations described herein. For example, in the previously referred to embodiment of the invention, the operations of the flight control unit 40 are performed within three programmable digital computers of the triple redundant, fail/operational-fact/passive flight control system that provides an integrated system to accommodate several other flight control functions, such as the previously mentioned automatic control of the USB flap position and engine throttle settings to orient the thrust vector supplied by the USB flaps, so as to provide the proper forward and lift thrust components. During a STOL landing maneuver, such a flight control system automatically controls the USB flaps 24 and 26 and engine throttles of the aircraft depicted in FIG. 1 to maintain the aircraft at a selected approach velocity while the aircraft is being guided along a desired glide path. In any case, the flight control unit 40 receives signals from the input devices within the dashed outline 42 to detect an engine failure, detect whether the aircraft is executing a STOL takeoff or landing maneuver, and supplies appropriate signals to the actuators within the dashed outline 44 to reconfigure the aircraft as previously described relative to FIGS. 2 and 3.

As shall be described in more detail hereinafter, the failure of an engine is detected on the basis of pressure levels within the engines 12 and 14. In the arrangement of FIG. 5, pressure sensors 46 and 48, respectively mounted within the engines 12 and 14, supply signals representative of the internal engine pressure which in turn are representative of the thrust being supplied by that particular engine. In the previously referred to embodiment of the invention, the pressure sensors 46 and 48 are conventional triplex pressure sensors mounted in pressure ports between turbine stages of the engines 12 and 14 with an output signal from each pressure sensor 46 and 48 being supplied to each of the three digital flight control computers. Preferably, as shall be described relative to FIG. 7, the control system of this invention is arranged to detect engine failure by comparing the difference in engine pressure between the engines 12 and 14 to a predetermined threshold and by comparing the pressure within each engine 12 and 14 with a threshold level that is representative of a minimum thrust level, e.g., engine idle thrust level. Additionally, to prevent spurious changes in engine pressure from causing an incorrect indication of engine failure, the control system is preferably arranged such that an engine failure will not be indicated unless the thrust being supplied by one of the engines 12 or 14 is less than the minimum thrust threshold for a predetermined time interval and the magnitude of the difference between the two pressure signals continuously exceeds the predetermined pressure threshold during this predetermined time interval.

In the embodiment of FIG. 5, the flight control unit 40 detects whether a STOL landing or takeoff maneuver is being executed on the basis of signals supplied by a flap position selector 49. The flap position selector 49 is the mechanism utilized by the aircraft commander to deploy the USB flaps 24 and 28, the center and outboard flaps 28 and 30, and the spoilers 34 in the proper position to execute a desired maneuver. In particular, as in conventional aircraft, predetermined settings of the aircraft control surfaces are associated with the landing and takeoff maneuvers of a STOL aircraft, which predetermined settings can provide an indication of the procedure being attempted. Specifically, in the previously referred to STOL aircraft in which the invention is embodied, the flap position selector 49 includes five positions with one position corresponding to all flaps retracted, two positions corresponding to flap deployment for takeoff maneuvers in which the aircraft is carrying a heavy load and a STOL takeoff cannot be undertaken, one position corresponding to deployment of the control surface deployment for STOL takeoff, and two positions corresponding to STOL landing maneuvers. To simplify the identification of these positions, the five positions of the flap position selector 49 are respectively labeled "up" and settings of "10", "20", "30", "45" and "60", even though the indicated "settings" do not correspond to the angular deployment of either the center and outboard flaps 28 and 30, or the USB flaps 24 and 26. For example, when the flap position selector 49 is set in the STOL takeoff position of "30" or the STOL landing positions of "45" and "60", the center and outboard flaps are fully extended to an angle of approximately 60°, with the USB flaps retracted in the STOL takeoff setting of "30" and extended for thrust vectoring when the flap position selector 49 is set at the STOL landing settings of "45" and "60". As previously described, the spoilers 34 are deployed as direct lift control devices only when the flap position selector 49 is set to execute a full STOL landing ("60").

In the arrangement of FIG. 5, the flight control unit 40 detects that a STOL landing or takeoff maneuver is being executed by comparing a signal representative of the setting of the flap position selector 49 with a first threshold value to determine whether the position selector is set at a position of 30 or greater. To determine whether the STOL procedure is a landing maneuver, the flight control unit 40 compares the setting of the flap position selector 49 with a second threshold value to determine whether the position selector is set at a position of "45" or greater, i.e., "60".

It will be recognized by those skilled in the art that various other arrangements can be utilized to determine whether the aircraft is executing a STOL takeoff or landing procedure. For example, the signals supplied by the center and outboard flap position sensors 50 and 52 of FIG. 5, the USB flap position sensors 58 and 60, and a position sensor associated with the spoilers 34 can be logically processed within the flight control unit 40 to determine if the control surfaces are being deployed to place the aircraft in a STOL landing or takeoff configuration.

As previously described, in the STOL aircraft 10 of FIG. 1, spoilers 34 can be utilized as direct lift control devices during a STOL landing approach, i.e., when the flap position selector 49 of FIG. 5 is set at the "60" position. When embodied in such a STOL aircraft, the flight control unit 40 supplies a signal to spoiler actuators 54 and 56 to cause the spoilers to be "downrigged", i.e., restored to a position substantially flush with the upper surface 20 and 22 of the wings 16 and 18, whenever an engine is inoperative and the setting of the flap position selector 49 exceeds the second threshold level. Preferably, the spoiler actuators 54 and 56 are the conventional actuators utilized on the aircraft in which the invention is embodied, with the flight control unit 40 deactivating the signal supplied to activate the spoilers 34 as direct lift control devices during a STOL landing approach at maximum flap setting.

Additionally, the signals supplied by the flap position sensors 50 and 52 are utilized in conjunction with signals supplied by USB flap position sensors 58 and 60 during either a STOL takeoff or landing procedure whenever an engine is inoperative. For example, in the situation depicted in FIGS. 2b and 3b wherein the engine 14 (right engine) has failed, the flight control unit 40 compares a signal provided by the USB flap position sensor 60 with the signal provided by the flap position sensor 52 and supplies a servo actuator 64, which drives the USB flap 26, with a control signal until the position of the USB flap 26 matches the position of the adjacent center and outboard flaps 28 and 30. In a similar manner, if the left engine 12 fails, the signal provided by the USB flap position sensor 58 is compared with the signal supplied by the flap position sensor 50 to supply a command signal to a servo actuator 62 for driving the USB flap 24 into alignment with the flaps 28 and 30 of the wing 16. The flap position sensors 50 and 52 and the USB flap position sensors can be conventional flap position sensors which sense either the actual position of the flaps or the command signal being supplied to the flaps.

To open the slots 36 of the USB flap 24 or 26 whenever one of the USB flaps is extended behind inoperative engine 12 or 14, the flight control unit 40 supplies a signal to the appropriate slot actuator mechanism 66 or 68. As described in the previously referenced patent applications, the slot actuator mechanism 66 and 68 are generally conventional hydraulic, pneumatic or electrical mechanisms. Accordingly, the signal provided by the flight control unit 40 is conditioned to suit the particular actuator employed on the USB flap being utilized. To prevent damage to the USB flap structure, slots 34 are not opened unless the extension of the USB flap being deployed exceeds a predetermined angle. That is, as can be recognized from the previously referenced patent applications describing the USB flaps suitable for the practice of this invention, actuation of the slot mechanism with the USB flap in a retracted, or even slightly extended position, would cause interference between adjacent members of the USB flap structure. Accordingly, in the practice of this invention, the slot actuator mechanisms 66 and 68 are not activated unless the signal supplied by the appropriate USB flap position sensor 58 or 60 indicates that the USB flap being extended behind an inoperative engine reaches a predetermined position, More explicitly, in the situation in which a USB flap of the previously referenced applications is embodied in the STOL aircraft of FIG. 1, the slots 34 are opened only when the USB flaps 24 or 26 is extended to correspond to the position of center and outboard flaps 28 and 30 that are extended to a STOL takeoff or landing position, i.e., the flap position signal supplied by the flap position selector 49 exceeds the first predetermined threshold value.

To position the center and outboard flaps 28 and 30 of the aircraft wing which includes the operative engine, the flight control unit 40 supplies a command signal to a flap trim servo actuator 70 for positioning the flaps 28 and 30 of the wing 16 or to a flap trim servo actuator 72 for positioning the flaps 28 and 30 of the wing 18. The flap trim servo actuators 70 and 72 are conventional servo actuators, with the flight control unit 40 supplying a control signal to the flap trim servo 70 and 72 until the appropriate flaps 28 and 30 are retracted to a position which substantially counteracts the roll moment caused by an inoperative engine.

In the practice of this invention, it has been found satisfactory to retract the flaps 28 and 30 of the powered wing as a predetermined function of aircraft velocity. In particular, it has been found advantageous to retract flaps 28 and 30 of the powered wing (e.g., wing 16 in the situation depicted in FIG. 2b) by a predetermined amount when the aircraft velocity is within a range which includes typical STOL landing approach speeds and retract the flaps 28 and 30 by a lesser amount when the aircraft velocity is greater than the typical speeds at which the aircraft makes a STOL landing approach. To enable the flight control unit 40 to adjust flap position as a function of aircraft velocity, the flight control unit 40 is interconnected with the aircraft air data system 74.

Figure 6:
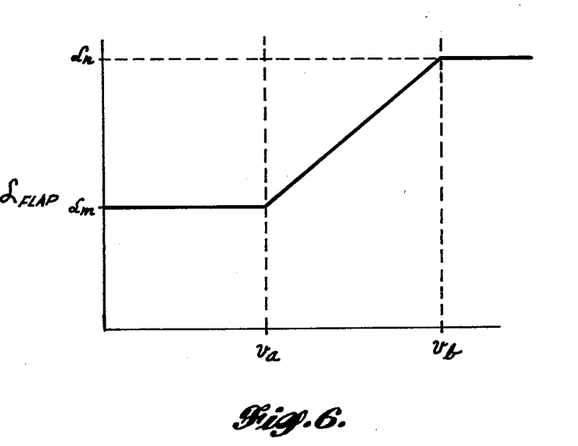
FIG. 6 is a diagram depicting the flap trim utilized to reduce roll moment during a STOL landing procedure with one engine inoperative.

The flap retraction schedule utilized in the previously described embodiment of this invention is depicted in FIG. 6 with $\delta n$ denoting the normal (both engines fully operative) extension of the flaps 28 and 30. For aircraft velocities less than $v_a$, where $v_a$ is equal to a slightly greater than the maximum normal STOL approach velocity, the flaps 28 and 30 of the powered wing are retracted by an amount equal to $\delta n$ minus $\delta m$ where $\delta m$ is the flap extension angle with maximum flap trim applied. For aircraft velocites exceeding $v_a$ but less than a velocity $v_b$, retraction of the flaps 28 and 30 linearly decreases such that for aircraft velocities exceeding $v_b$, no flap trim is applied. By way of example only, in one particular embodiment of the invention, the maximum flap trim $\delta n - \delta m$ is established at 30° with the aircraft velocities $v_a$ and $v_b$ respectively corresponding to 90 and 125 knots.

FIGS. 7, 8, 9 and 10 depict logic diagrams which illustrate the operation of the flight control unit 40 of FIG. 5 to detect an engine failure and operate the USB flaps 24 and 26, the center and outboard flaps 28 and 30, and the spoilers 34 in the above described manner. Although FIGS. 7 through 10 depict the logic operations in the form of flow charts commonly used in conjuction with programming a digital computer or establishing the interconnections within a microprocessor unit, it will be recognized by those skilled in the art that conventional logic circuits such as gate circuits, comparator circuits, and counter circuits can be configured in an equivalent arrangement. In any case, it should be recognized that the logic operations depicted in FIGS. 7 through 10 are sequentially performed at an iteration rate that is compatible with overall system operation. For example, in the embodiment of the invention in which the flight control unit 40 is embodied within a digital flight control computer that also performs other STOL flight control functions, the iteration rate is 25 iterations per second to provide essentially continuous monitoring of engine operation and operation of the control system of this invention.

Figure 7:
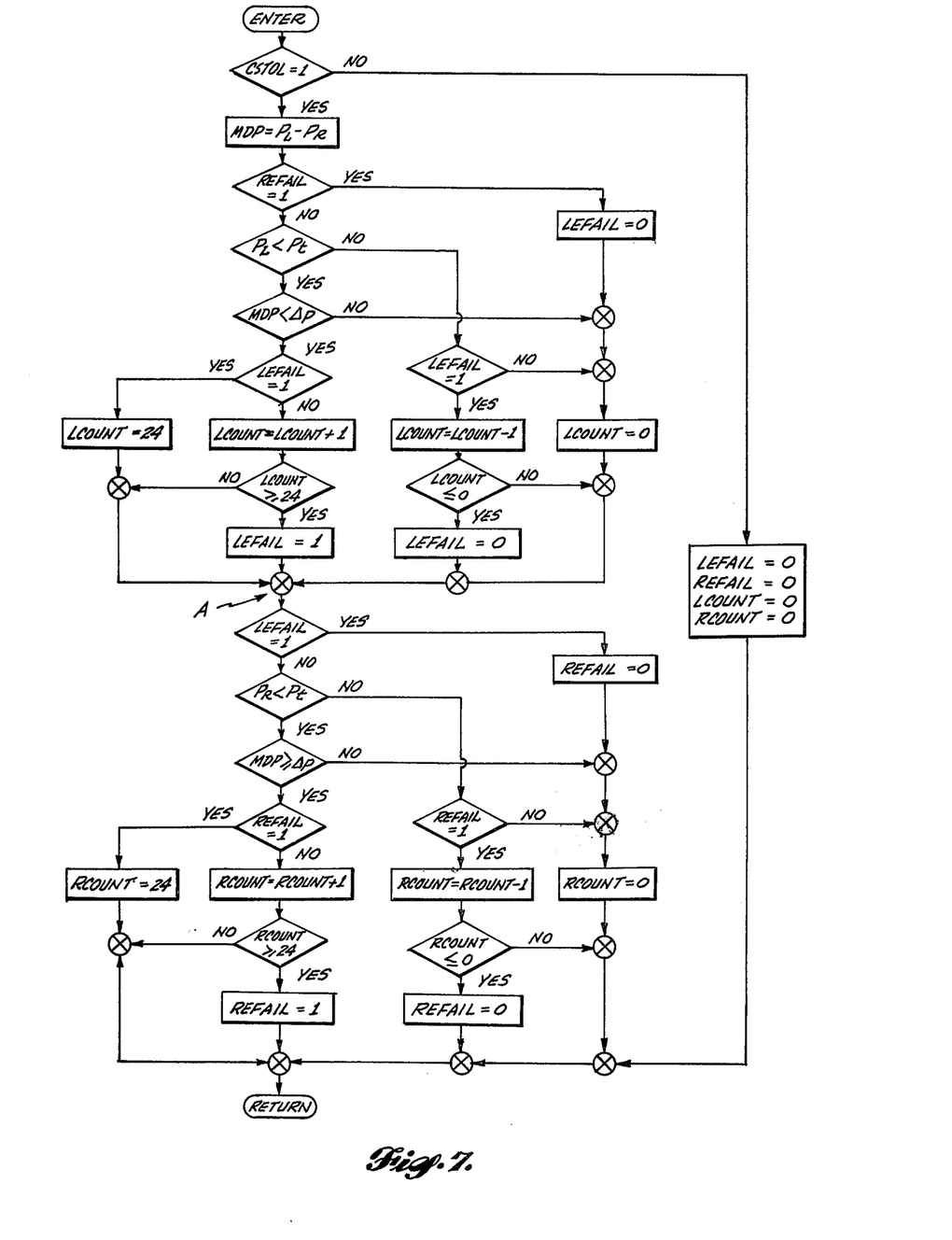
FIGS. 7, 8, 9 and 10 are logic diagrams which illustrate the operational arrangement of the flight control unit of FIG. 5 to activate the aircraft flight control surfaces during STOL landing and takeoff maneuvers in which one engine is inoperative.

Referring to FIG. 7, the flight control unit 40 first determines whether the aircraft is engaged in a STOL takeoff or landing maneuver by determining whether the "flag" or logic variable CSTOL is equal to a logical 1. The flag CSTOL can alternatively be set equal to 1 whenever the signal supplied by the flap position selector 49 exceeds the first threshold value, or by a switch with which the STOL flight control system is engaged. If the flag CSTOL is not equal to 1, i.e., CSTOL equals a logical 0, the flight control unit 40 sets the flags LEFAIL and REFAIL, which respectively indicate failure of the left engine (engine 12 of FIG. 1) and the right engine (engine 14 of FIG. 1), and the program variables LCOUNT and RCOUNT equal to 0. As shall be described in more detail hereinafter, the program variables LCOUNT and RCOUNT are utilized to establish a time interval during which an indication must be present that the engine 12 or 14 is inoperative before the flight control unit 40 generates a signal declaring the engine to be inoperative, i.e., sets the LEFAIL or REFAIL flag equal to 1.

If the aircraft is executing a STOL takeoff or landing maneuver (CSTOL=1), the flight control unit 40 determines the difference between the pressure signals supplied by the engine pressure sensors 46 and 48 of FIG. 5. In the diagram of FIG. 7, the engine pressure differential is identified by the variable $MDP = P_L - P_R$ where $P_L$ is the pressure supplied by the engine pressure sensor 46 (left engine) and $P_R$ is the pressure signal supplied by the engine pressure sensor 48 (right engine). Next, the REFAIL flap is tested to determine if a failure of the engine 14 was declared during the previous iteration period. If the right engine (engine 14) has previously been declared inoperative, the flag LEFAIL and the LCOUNT variable are set equal to 0 and the logic sequence advances to point A of FIG. 7, which is effectively the starting point for detecting the failure of the right engine 14.

If the right engine was not declared inoperative during the previous iteration, the pressure supplied by the engine pressure sensor 46 is compared to a pressure threshold $P_t$ where $P_t$ is an engine pressure corresponding to a predetermined minimum engine thrust that must be developed by a functioning engine, e.g., minimum thrust produced by the engine under engine idle condition. If the engine pressure $P_L$ is greater than $P_t$, the engine 12 is operating during the present iteration period. In this case, the flight control unit 40 detects whether the left engine was declared inoperative during the previous iteration by testing the LEFAIL flag. If the LEFAIL flag is not equal to 1, (i.e., LEFAIL equals 0), the engine 12 was operative during the previous iteration, the LCOUNT variable is set equal to 0 and the flight control unit 40 sequences to point A for the start of the test sequence for determining failure of the right engine 14.

If it is determined that the left engine 12 is operative during the present iteration but was inoperative during the previous iteration, i.e., $P_L$ not less than $P_t$ and the flag LEFAIL is equal to 1, the variable LCOUNT is reduced by 1 and tested to determine whether or not the modified variable LCOUNT is less than or equal to 0. If LCOUNT is presently less than or equal to 0, the flag LEFAIL is set equal to 0 and the logic sequence advances to point A for beginning the test sequence to determine whether the right engine 14 is operative. If the present value of LCOUNT is not less than or equal to 0, the flag LEFAIL remains equal to 1 and the sequence advances to point A of FIG. 7.

If it is determined that $P_L$ is less than $P_t$, i.e., that the pressure within engine 12 is less than the predetermined threshold of pressure during the present iteration, the flight control unit 40 determines if the magnitude of the pressure differential, MDP, is greater than a predetermined pressure differential $\Delta_p$, where $\Delta_p$ is selected to represent a thrust differential between the engines 12 and 14 that occurs when one of the engines is inoperative. If the magnitude of the engine pressure differential is not greater than $\Delta_p$, the flight control unit 40 advances to the point A of the sequence depicted in FIG. 7. If the magnitude of the engine pressure differential is greater than $\Delta_p$, the engine 12 is inoperative during present iteration and the flight control unit 40 determines whether or not the engine 12 was inoperative during the previous iteration by determining whether LEFAIL is equal to 1. If it had been determined during the previous iteration that the left engine 12 was inoperative, i.e., LEFAIL=1, the variable LCOUNT is set equal to a maximum count (24 in the diagram of FIG. 7)

and the flight control unit 40 advances to point A of the sequence. If a failure of the left engine 12 was not declared during the previous iteration, LEFAIL is not equal to 1, the variable LCOUNT is increased by 1 and LCOUNT is then compared to the maximum count (24 in the depicted embodiment), where the maximum count is established to define a suitable time interval. If the present value of the variable LCOUNT is not greater than or equal to the maximum count of 24 the flight control unit 40 advances to point A of the sequence. If however the value of LCOUNT during the present iteration is equal to or greater than 24, the left engine 12 is declared to be inoperative by setting the flag LEFAIL equal to 1 and advancing the flight control unit 40 to point A of the sequence. With the flight control unit 40 at point A of the sequence of FIG. 7, the determination of the failure state of left engine 12 is complete for the present iteration. Examining FIG. 7, it will be noted that after reaching point A of the sequence, the flight control unit 40 performs identical operations involving the quantities $P_R$, RCOUNT, and REFAIL to determine the operational state of the right engine 14.

In view of the above-described operation of the flight control unit 40, it can be recognized that two conditions must occur for a predetermined period before a failure of either engine is declared. Specifically, the engine thrust must be below a predetermined threshold (as determined by the engine pressure $P_R$ or $P_L$ being below the threshold $P_t$), and the magnitude of the difference in thrust between the two engines must be greater than a predetermined thrust differential (as determined by comparing the variable MDP with the threshold value $\Delta_p$. Further, both conditions must occur for a predetermined time interval as established by accumulating variables LCOUNT and RCOUNT to a maximum value (24 in the diagram of FIG. 7) before failure of the left or right engine is declared. With respect to the accumulation of the variables LCOUNT and RCOUNT, the seqence depicted in FIG. 7 operates in the same manner as a conventional, digital up/down counter circuit. Thus it can be seen that, in an embodiment in which the flight control unit 40 is implemented by conventional logic circuits, a conventional up/down counter can be combined with appropriate comparator circuits, gate circuits and timing apparatus, i.e., a clock circuit, to effect a conventional logic circuit implementation of flight control unit 40.

Regardless of whether the flight control unit 40 is realized in digital computer form or as a conventional logic circuit, utilizing both a minimum thrust level and the difference in thrust between the two engines as the failure criteria and declaring an engine inoperative only if an engine does not exceed both portions of the failure criteria is advantageous. Specifically, if either the minimum thrust level or thrust differential is utilized as a sole criteria, engine failure could be declared under conditions in which both engines are operative. For example, if thrust differential is the sole criteria, an engine failure could be declared if the throttles of one engine are retarded during ground operations or even during flight. On the other hand, if a minimum thrust differential is utilized as a sole failure criteria, a failure condition in which one engine produces a relatively large amount of thrust while the second engine, due to a failure condition, produces a substantially lesser amount of thrust not be detected. Requiring both conditions to exist for a number of iterations to define a time interval on the order of, for example, one second is advantageous in that an engine failure is not declared in response to spurious pressure changes within one of the engines. Such spurious pressure changes occur, for example, when the aircraft is taxiing on a runway and an exhaust stream from another aircraft reaches the engine inlet to cause disruption in the airflow through the engine.

Figure 8:
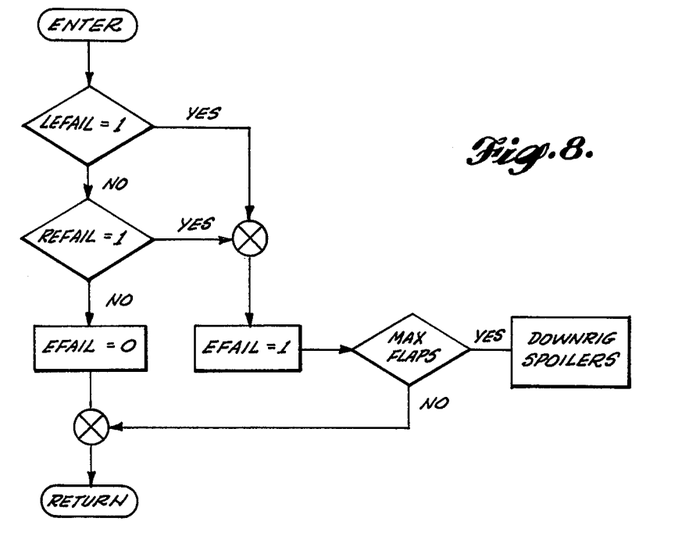

FIG. 8 depicts an appropriate logic sequence for the flight control unit 40 to effect the previously described downrigging of the spoilers 34 during an STOL landing approach wherein one engine is inoperative and the spoilers 34 are being utilized as direct lift control devices. In the arrangement of FIG. 8, the failure of one of the engines 12 and 14 is detected by determining whether the flag LEFAIL or the flag REFAIL is equal to 1. If neither flag is equal to 1, a failure flag EFAIL, which denotes the failure of one of the two engines, is set equal to 0. If either of the engines has failed, the flag EFAIL is set equal to 1 and the flap setting signal supplied by the flap position selector 49 in FIG. 5 is compared with a threshold value to determine if the center and outboard flaps 28 and 30 are deployed in a position in which the spoilers 34 are uprigged. If the spoilers are uprigged, the flight control unit 40 immediately downrigs the spoilers. If the center and outboard flaps 28 and 30 are not at a position in which the spoilers 34 are uprigged, the sequence is complete.

Figure 9:
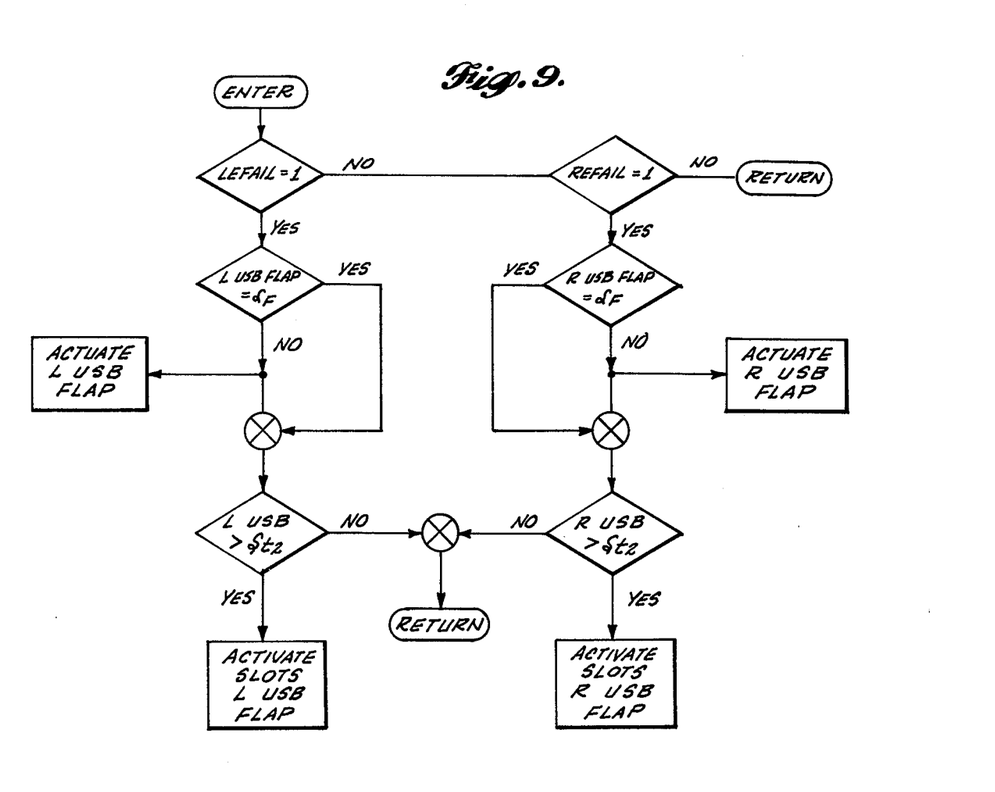

FIG. 9 depicts a suitable logic sequence for positioning the USB flap 24 or 26 behind an inoperative engine 12 or 14 and opening the appropriate USB flap slots 36 during either a STOL takeoff or landing maneuver. The sequence is initiated after determining whether either a STOL takeoff or landing is being attempted, i.e., the variable CSTOL=1 as described relative to the logic sequence of FIG. 7. In the arrangement of FIG. 9, the engine failure flags LEFAIL and REFAIL are detected to determine whether the left engine 12 or right engine 14 is inoperative. If both engines are operative, i.e., neither LEFAIL and REFAIL are equal to 1, no further action is performed by the flight control unit 40. If, however, either LEFAIL and REFAIL is equal to 1, the flight control unit 40 positions the appropriate USB flap 24 or 26 and opens the USB flap slots 36. For example, if the left engine 12 is inoperative (flag LEFAIL=1) the signal supplied by the left engine USB flap position sensor 58 of FIG. 5 is compared to the signal supplied by the center and outboard flap position sensor 50 of FIG. 5. In the diagram of FIG. 9, the position of the center and outboard flaps 28 and 30 is denoted by $\delta_F$. If, during the present iteration, the USB flap 24 is not positioned to correspond to the position of the adjacent center and outboard flaps 28 and 30, the flight control unit 40 activates the left USB flap 24 by supplying a signal to the USB flap servo actuator 62 of FIG. 5. Regardless of whether the USB flap 24 is presently positioned to correspond to the position of the adjacent center flap 28 and outboard flap 30 or whether the USB flap 24 is being so positioned by actuation of the servo actuator 62, the flight control unit 40 next determines whether the present position of the USB flap 24 exceeds a threshold value $\delta_{f1}$ where the threshold $\delta_{f1}$ is established to determine the deployment angle of the USB flap at which the slots 36 will be opened. For example, with respect to the previously described aircraft wherein the flap position selector 49 is set at a position of "45" or "60" for STOL landing maneuvers, the threshold $\delta_{f2}$ can be the previously second threshold value which is utilized to determine if a STOL landing is being executed (e.g., $\delta_{t2}=42°$). If the USB flap 24 is set to an angle greater than the threshold $\delta_{t2}$, the flight control unit 40 supplies a signal to activate the slot actuator 66 of FIG. 5 to open the slots 36 of the USB flap 24. As can be seen in FIG. 9, if the right engine is inoperative and the aircraft is executing a STOL landing or takeoff maneuver, the flight control unit 40 operates the USB flap 26 and the slots 36 therein in the same manner.

In view of the above-described sequence, it can be recognized that the position of a USB flap 24 or 26 located behind an inoperative engine 12 or 14 will be repositioned with each iteration of the flight control unit 40. Thus, the USB flaps 24 and 26 are effectively controlled to follow any changes in the position of the flaps 28 and 30. For example, should the aircraft attempt to execute a go-around maneuver during a STOL landing approach with an inoperative engine, the USB flap behind the inoperative engine will operate in conjunction with the center and outboard flaps 28 and 30.

Figure 10:
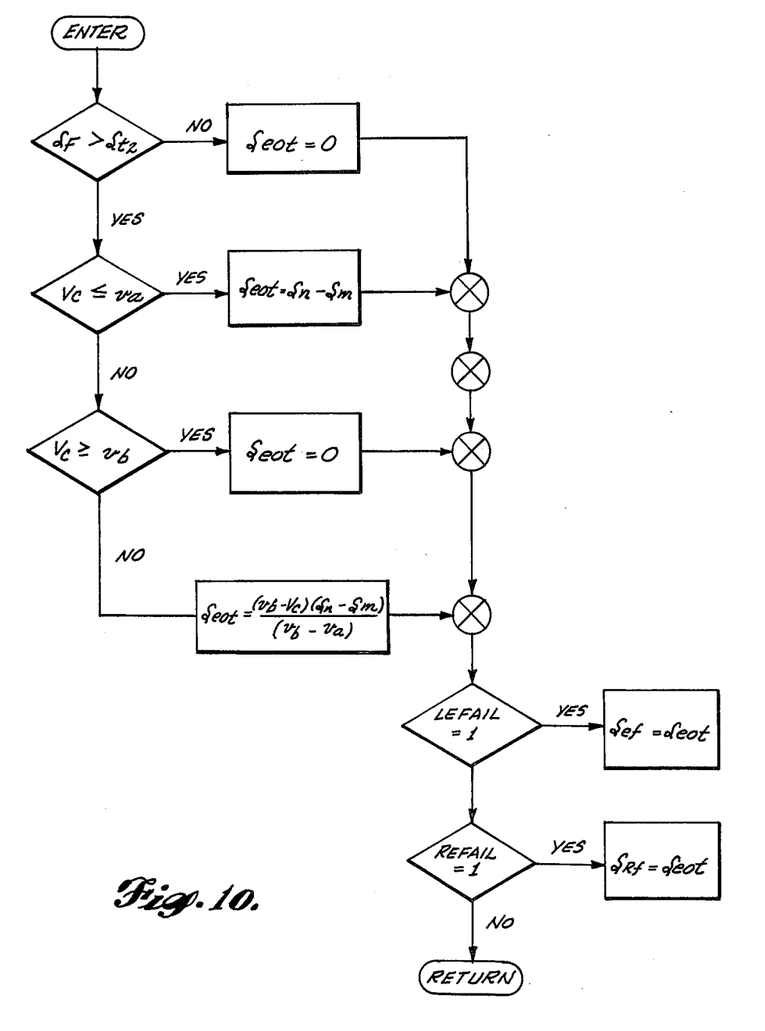

FIG. 10 depicts a suitable logic sequence for flight control unit 40 to effect the retraction of the center and outboard flaps 28 and 30 of that wing including the operative engine during a STOL landing maneuver in which one engine has failed. In particular, the arrangement of FIG. 10 retracts appropriate flaps 28 and 30 in accordance with the schedule illustrated in FIG. 6. In FIG. 10, the signal, $\delta_F$ supplied by the flap position selector 49 of FIG. 5 is compared to the previously described second threshold $\delta_{t2}$ to determine if the procedure being executed is a STOL landing maneuver. If $\delta_F$ is less than the threshold value $\delta_{t1}$, indicating that a STOL landing maneuver is not being attempted, no flap trim is necessary and the flap trim variable $\delta_{eot}$ is set equal to 0°. If $\delta_F$ is greater than $\delta_{t2}$, indicating that a STOL landing maneuver is being attempted, the aircraft velocity signal, supplied by the air data system 74 in FIG. 5, is compared with the velocity $v_a$ previously defined relative to FIG. 6. If the present aircraft velocity $V_c$ is less than or equal to $v_a$, the flap trim variable $\delta_{eot}$ is set for maximum trim of the appropriate flaps 28 and 30, i.e., $\delta_n-\delta_m$. If the aircraft velocity $V_c$ exceeds the velocity $v_a$, and exceeds the velocity $v_b$ of FIG. 6, the flap trim variable $\delta_{eot}$ is set equal to 0. If however, the aircraft velocity $V_c$ is within the velocity range defined by the velocities $v_a$ and $v_b$, the flap trim variable $\delta_{eot}$ is set equal to $(v_b-V_c)(\delta_n-\delta_m)/(v_b-v_a)$. Once the proper flap trim variable $\delta_{eot}$ has been determined, the flight control unit 40 determines whether the inoperative engine is engine 12 or engine 14 by determining which of the engine failure flaps LEFAIL or REFAIL is equal to 1 and supplies an appropriate signal to the flap trim servo actuator 70 or the flap trim servo actuator 72 of FIG. 5. That is, if the failure flag LEFAIL is equal to 1, the left engine 12 is inoperative and the flap trim signal is applied to the flap trim servo actuator 70 whereas if the failure flag REFAIL is equal to 1, the right engine 14 is inoperative and the flap trim signal is applied to the flap trim servo actuator 72.

It will be recognized by those skilled in the art that the embodiment of the invention described herein is exemplary in nature and that many variations can be practiced without departing from the scope and spirit of the invention. For example, as previously mentioned the flight control unit 40 can be realized as a programmable digital computer, a microprocessor unit, or as an arrangement of conventional logic circuits. Further, although the invention is described in the context of a STOL aircraft having two engines and conventional slotted flaps including a center and outboard flap on each wing of the aircraft, other multi-engine aircraft having various known conventional flap arrangements used in conjunction with lift augmentation flaps (such as the disclosed USB flaps) can advantageously employ the invention.

What is claimed is:

1. In an STOL aircraft including first and second oppositely disposed wings projecting outwardly from a fuselage wherein at least one gas turbine engine is positioned on each of said first and second wings for supplying an exhaust stream to a lift augmentation flap extendable downwardly and rearwardly from the trailing edge of the wing upon which said engine is mounted, said lift augmentation flap including at least one spanwise slot and slot closure means for selectively opening or closing each of said spanwise slots, and wherein each of said first and second wings of said STOL aircraft further includes at least one slotted flap extendable downwardly and rearwardly from the trailing edge of said aircraft wing at a position in which said slotted flap is not supplied with an engine exhaust stream from said engine supplying said exhaust stream to said lift augmentation flap, an automatic control system for activating said lift augmentation flaps and said slotted flaps when said STOL aircraft effects a landing maneuver with one engine in an inoperative state wherein the thrust supplied by that engine is less than a predetermined thrust level, said automatic control system comprising:

engine failure detection means for detecting said inoperative state of one of said gas turbine engines;

means responsive to said engine failure detection means for extending that lift augmentation flap normally supplied with an exhaust stream by said inoperative engine to a position wherein the rearward and downward extension of said lift augmentation flap corresponds to the rearward and downward extension of the slotted flap located on that wing of said aircraft including said inoperative engine;

means for activating said slot closure means to open said spanwise slot of said lift augmentation flap normally supplied with an exhaust stream by said inoperative engine; and means for partially retracting the slotted flap of the wing not including said inoperative engine to reduce roll moment and associated drap caused by said inoperative engine.

2. The automatic control system of claim 1 wherein said engine failure detection means includes a pressure sensor mounted within each of said engines for supplying an exhaust stream to a lift augmentation flap, each of said pressure sensors supplying an electrical signal proportional to the thrust being supplied by the engine in which said pressure sensor is mounted, and means for comparing each electrical signal supplied by a pressure sensor with at least one other electrical signal supplied by a pressure sensor of another of said engines.

3. The control system of claim 2 wherein said engine failure detection means further comprises means for comparing the electrical signals supplied by each of said pressure sensor with a predetermined threshold value.

4. The control system of claim 3 wherein said means for comparing each of said electrical signals supplied by said pressure sensors with at least one electrical signal supplied by a pressure sensor of one other of said engines and said means for comparing said electrical signals supplied by each of said pressure sensors with said predetermined threshold value is included within a digital flight control unit for processing digital data, said digital flight control unit periodically comparing said pressure sensor electrical signals with one another and periodically comparing each of said pressure sensor electrical signals with said predetermined threshold value.

5. The control system of claim 1 further comprising detection means for determining whether said STOL aircraft is executing a STOL landing maneuver and for determining whether said STOL aircraft is executing a STOL takeoff maneuver and means responsive to said detection means for activating said means for retracting the slotted flap of the wing not including said inoperative engine only when said STOL aircraft is executing a landing maneuver with an inoperative engine.

6. The control system of claim 1 wherein said STOL aircraft further includes spoilers mounted on the upper surface of said first and second wings, said spoilers being deployable from a position substantially flush with said upper surface of said first and second wings to an upwardly extending position for direct lift control during a STOL landing maneuver, said control system further comprising means for returning said spoilers to said substantially flush position when said spoilers are deployed for direct lift control and said engine failure means detects an inoperative engine.

7. A method for automatically reconfiguring the control surfaces of an STOL aircraft having at least two engines when one of said engines is inoperative to the extent that such engine does not supply a desired level of thrust and said aircraft executes a STOL takeoff or landing maneuver, said engines being mounted on left and right wings of said aircraft with each of said engines supplying an exhaust stream to an associated extendable upper surface blown flap, each of said upper surface blown flaps extending spanwise along the trailing edge of the aircraft wing at a position aft of said associated engine, each of said upper surface blown flaps including slot means for opening at least one spanwise slot in said upper surface blown flap in response to a predetermined signal, said STOL aircraft also having at least two conventional slotted flaps, at least one of said conventional slotted flaps extending spanwise along the trailing edge of the aircraft wing at a position outboard of an upper surface blown flap, said method comprising the steps of:
    detecting that one of said engines is inoperative;
    automatically extending the upper surface blown flap located aft of said inoperative engine to an angle of extension which corresponds to the angle of extension of said conventional slotted flap located outboard of said upper surface blown flap being extended;
    supplying said predetermined control signal to open said spanwise slot in said upper surface blown flap located aft of said inoperative engine;
    automatically retracting each of said conventional slotted flaps located on the wing of said aircraft not including said inoperative engine, said conventional slotted flap being retracted to a position that at least partially counteracts the roll moment caused by said inoperative engine.

8. The method of claim 7 further comprising the steps of:
    determining whether said STOL aircraft is executing a takeoff or landing maneuver;
    automatically retracting each of said conventional slotted flaps located on the wing of said aircraft not including said inoperative engine only when said aircraft is executing a landing maneuver.

9. The method of claim 8 wherein said STOL aircraft further includes spoilers located on the upper surface of said left and right wing wherein said spoilers are deployable from a position flush with said wing upper surface to an upwardly extending position for direct lift control during STOL landing maneuvers, said method further comprising the step of returning said spoilers to said flush position when said aircraft is executing a landing procedure and one engine is inoperative.

10. The method of claim 7 wherein said step of detecting that one of said engines is inoperative includes the steps of:
    sensing a pressure internal to each of said engines that is representative of the thrust being supplied by each of said engines;
    determining the difference between the pressure associated with each particular engine and the pressure associated with at least one other engine of said engines;
    comparing the magnitude of said pressure difference with a first predetermined threshold value;
    comparing the pressure associated with each of said engines with a second predetermined threshold value;
    supplying a signal indicating a particular engine is inoperative when said pressure associated with said particular engine is less than said second predetermined threshold value and the magnitude of the difference between the pressure associated with a particular engine and the pressure associated with at least one other engine exceeds said first predetermined threshold value.

11. An automatic control system for improved short take off and landing performance of a STOL aircraft powered by at least two gas turbine engines wherein each outwardly extending wing of said STOL aircraft includes at least one flap that is extendable downwardly and rearwardly from the trailing edge of said wing to provide lift during take off and landing maneuvers and wherein each wing of said STOL aircraft includes at least one lift augmentation flap extendable downwardly and rearwardly from said trailing edge of said wing for receiving and redirecting at least a portion of the exhaust stream supplied by at least one of the gas turbine engines of said STOL aircraft, each of said lift augmentation flaps including at least one spanwise slot that is selectively openable and closable in response to a first predetermined control signal, said automatic control system activating said flaps and said lift augmentation flaps during short take off and landing maneuvers when one of said gas turbine engines supplying exhaust to one of said lift augmentation flaps is inoperative to the extent that said inoperative engine fails to provide a predetermined thrust level, said automatic control system comprising:
    thrust detection means for determining the thrust level being supplied by each of said gas turbine engines that supply an exhaust stream to one of said lift augmentation flaps, said thrust detection means including means for supplying a signal representative of the thrust levels of each of said gas turbine engines;

means for supplying a first command signal when said STOL aircraft undertakes a short take off maneuver and for supplying a second command signal when STOL aircraft undertakes a short landing maneuver; and flight control means responsive to said signals representative of the thrust level being supplied by each of said gas turbine engines that supply an exhaust stream to one of said lift augmentation flaps and responsive to said first and second command signals representing that said STOL aircraft is undertaking a short take off and landing maneuver, said flight control means including comparison means for comparing each of said thrust representative signals with a predetermined threshold signal to determine when one of said gas turbine engines fails to provide said predetermined thrust level, said comparator means supplying an engine failure signal indicative of which one of said gas turbine engines is inoperative in that said inoperative engine is providing a thrust level less than said predetermined thrust level, said flight control means further including lift augmentation flap control means responsive to said engine failure signal and responsive to signals representative of the rearward and downward extension of said flaps and said lift augmentation flaps for supplying a signal to that particular lift augmentation flap normally supplied an exhaust stream by said inoperative gas turbine engine, said lift augmentation flap control means supplying a signal to deploy said particular lift augmentation flap to an extended position substantially corresponding to the extended position of each flap located on the same wing of said STOL aircraft as said particular lift augmentation flap, said lift augmentation flap control means including means for supplying said first predetermined control signal to open said spanwise slot of said particular lift augmentation flap normally supplied an exhaust stream by said inoperative gas turbine engine when said lift augmentation flap is extended downwardly and rearwardly by a predetermined amount, said flight control means further including flap retraction means responsive to said second command signal and said engine failure signal for supplying a flap retraction signal to partially retract each of said flaps other than said lift augmentation flaps that are located on said wing not including said particular lift augmentation flap that is normally supplied an exhaust stream by said inoperative engine, said flaps being retracted to at least partially alleviate roll moment caused by said inoperative engine failing to provide said predetermined thrust level.

12. The automatic flight control system of claim 11, wherein said flap retraction means of said flight control means is responsive to a signal representative of the forward velocity of said STOL aircraft, said flap retraction means including means for supplying said flap retraction signal to maintain said flaps in a first predetermined extended position when said forward velocity of said STOL aircraft exceeds a first predetermined velocity, said flap retraction means including means for supplying said flap retraction signal to place each of said flaps at a second predetermined extended position when said forward velocity of said STOL aircraft is less than a second predetermined velocity, said flap retraction means further including means for supplying said flap retraction signal to place each of said flaps at an extension position between said first and second predetermined extended positions that is linearly related to said forward velocity of said STOL aircraft when said forward velocity is greater than said second predetermined velocity and less than said first predetermined velocity.

13. The automatic flight control system of claim 11, wherein said lift augmentation flap control means of said flight control means includes means for comparing a signal representative of the rearward and downward extension of said particular lift augmentation flap that is normally supplied an exhaust stream by said inoperative engine with a signal representative of the rearward and downward extension of each of said flaps located on the same wing of said STOL aircraft as said particular lift augmentation flap, said comparison means including means for supplying a difference signal representative of the difference between the rearward and downward extensions of said particular lift augmentation flap and said flap, said lift augmentation flap control means further including means for supplying a signal to move said lift augmentation flap toward the same extended position as said flap when said difference signals exceeds a predetermined threshold value.

14. The automatic flight control system of claim 11, wherein said comparison means of said flight control means further includes means for comparing said thrust representative signals with one another to detect when one of said gas turbine engines supplies a thrust level less than that supplied by others of said gas turbine engines by a predetermined thrust difference, said comparison means further including means for supplying said engine failure signal when a particular gas turbine engine is inoperative in that the thrust supplied by said particular gas turbine engine is less than said predetermined thrust level and the thrust level of said particular gas turgine engine is less than the thrust level supplied by others of said gas turbine engines by at least said predetermined thrust difference.

15. The automatic flight control system of claim 14, wherein said comparison means of said flight control means further includes means for supplying said engine failure signal only when the thrust representative signal associated with said particular gas turbine engines is less than said predetermined threshold signal and the thrust level of said particular gas turbine engine is less than the thrust level supplied by the others of said gas turbine engines for a predetermined time period.

16. The automatic flight control system of claim 11, wherein said STOL aircraft further includes spoiler panels positioned in the upper surface of each of said wings, said spoiler panels deployable from a first position wherein said spoiler panels are substantially flush with the upper surface of said wing to a second position wherein each of said spoiler panels extends upwardly from said upper surface of said wing to provide direct lift control when said STOL aircraft executes a short landing maneuver, said flight control means further including spoiler downrigging means responsive to said engine failure signal and said second command signal indicative that said STOL aircraft is executing a short landing maneuver to restore said spoiler panels to said first position.

17. An automatic flight control system for a STOL aircraft having first and second wings extending outwardly from a fuselage wherein first and second gas turbine engines are respectively mounted to supply rearwardly flowing exhaust effluent along predetermined regions of the upper surface of said first and second wings and wherein first and second upper surface blown flaps are respectively mounted along the trailing edge of said first and second wings, said first and second upper surface blown flaps being respectively mounted to receive at least a portion of the exhaust effluent from said first and second gas turbine engines that flows along said predetermined regions of said wing upper surfaces, said first and second upper surface blown flaps being respectively positionable in response to first and second command signals to extend said first and second upper surface blown flaps downwardly annd rearwardly for redirecting said received exhaust effluent to selectively provide both forwardly and upwardly directed thrust components, said first and second upper surface blown flaps each including at least one spanwise slot responsive to a slot control signal to operate from a closed position to an open position wherein ambient air flows through said slots to provide lift, said first and second wings each including slotted flaps mounted along the trailing edge of said first and second wings at a location other than those predetermined regions of said wing that receive exhaust effluent from said first and second gas turbine engines, each of said slotted flaps being operable in response to a flap control signal to extend downwardly and rearwardly for lift control during take off and landing maneuvers of said STOL aircraft, said slotted flaps of said first and second wings further being respectively operable in response to first and second differential flap control signals to selectively extend said slotted flaps of said first wing and selectively extend said slotted flaps of said second wing, said automatic flight control system for positionally controlling each of said slotted flaps and said first and second upper surface blown flaps during short take off and landing maneuvers in which one of said gas turbine engines fails to provide a predetermined thrust level, said automatic flight control system comprising:

first and second pressure sensors, said first pressure sensor being mounted within said first gas turbine engine to supply a first pressure signal representative of the thrust being produced by said first engine, said second pressure sensor being mounted within said second gas turbine engine to supply a second pressure signal representative of the thrust being produced by said second gas turbine engine;

a flap position selector including means for supplying said flap control signal to position each of said slotted flaps in a predetermined downwardly and rearwardly extending position when said STOL aircraft undertakes a take off and landing maneuver, said flap position selector further including means for supplying a first predetermined signal to indicate said STOL aircraft is engaged in a short take off maneuver and for supplying a second predetermined signal to indicate said STOL aircraft is engaged in a short landing maneuver; and a flight control unit for supplying said first and second differential flap control signals for positionally controlling said slotted flaps of said first and second wings and said first and second command signals for positioning said first and second upper surface blown flaps, said flight control unit including comparator means for comparing each of said first and second pressure signals with a predetermined threshold signal representative of a predetermined thrust level to supply a first engine failure signal when the thrust supplied by said first gas turbine engine is less than said predetermined thrust level and to supply a second engine failure signal when said thrust level supplied by said second gas turbine engine is less than said predetermined thrust level, said flight control unit including means for supplying said first command signal to extend said first upper surface blown flap downwardly and rearwardly to said predetermined extended position of the slotted flap of said first wing when said flap position selector supplies either of said first and second predetermined signals and said comparator means supplies said first engine failure signal and means for supplying said second command signal to extend said second upper surface blown flap downwardly and rearwardly to said predetermined extended position of the slotted flap of said second wing when said flap position selector supplies either of said first and second predetermined signals and said comparator means supplies said second engine failure signal, said flight control unit further including means for supplying said first differential flap control signal to partially retract said slotted flap of said first wing when said second engine failure signal is supplied and means for supplying said second differential flap control signal to partially retract said slotted flap of said second wing when said first engine failure signal is supplied, said flight control unit further including means for supplying said slot control signal to open each of said spanwise slots in said first upper surface blown flap when said first engine failure signal is supplied and said first upper surface blown flap is extended beyond a predetermined extension position, and means for supplying said slot control signal to open each of said spanwise slots in said second upper surface blown flap when said second engine failure signal is supplied and said second upper surface blown flap is extended beyond a predetermined extension position.

18. The automatic control system of claim 17, wherein said comparator means of said flight control unit includes means for comparing said first pressure signal with said second pressure signal to supply a pressure difference signal representative of the difference in thrust between the thrust being supplied by said first and second gas turbine engines, said comparator means further including means for supplying said first engine failure signal when the magnitude of said pressure differential signal exceeds a signal respresentative of a predetermined thrust differential and said first pressure signal is less than said predetermined signal representative of said predetermined thrust level, and means for supplying said second engine failure signal when said magnitude of said pressure differential signal exceeds said signal representative of said predetermined thrust differential and said second pressure signal is less than said predetermined signal representative of said predetermined thrust level.

19. The automatic control system of claim 18, wherein said comparator means includes time delay means for determining that said magnitude of said pressure differential signal exceeds said predetermined signal representative of said predetermined thrust difference and for determining that one of said first and second pressure signals is concurrently less than said predetermined signal representative of said predetermined thrust level for at least a predetermined time interval before supplying said first and second engine failure signal.

20. The automatic flight control system of claim 18, wherein said means for supplying said first and differential flap control signals to partially retract said slotted flaps includes means responsive to a signal representative of the forward velocity of said STOL aircraft, means for supplying a signal to retract said slotted flap by a first predetermined amount when said forward aircraft velocity is less than a first predetermined velocity, means for supplying a signal to maintain said slotted flaps in said predetermined downwardly and rearwardly extending position when said forward aircraft velocity is greater than a second predetermined velocity, and means for supplying a signal to retract said slotted flaps by an amount directly related to said forward aircraft velocity when said velocity is greater than said first predetermined velocity and less than said second predetermined velocity.

21. The automatic flight control system of claim 18, wherein said first and second wings of STOL aircraft each include at least one spoiler panel deployable from a first position wherein each of said spoiler panels of said first and second wings are substantially flush with the upper surface of said first and second wings to a second position in which said spoiler panels extend upwardly from said upper surface of said first and second wings, said spoiler panels being positioned in said second position in response to a spoiler deployment signal when said flap position selector is set in at least one position corresponding to a short landing maneuver, said flight control unit further comprising means for interrupting said spoiler deployment signal to return said spoiler panels to said first position whenever either of said first and second engine failure signals are supplied.

22. The method of claim 7 wherein said step of extending each of said upper surface blown flaps located aft of said inoperative engine comprises the steps of:

determining the difference between the angle of extension of said upper surface blown flap located aft of said inoperative engine and the angle of extension of said conventional flaps located outboard of said upper surface blown flap being extended; supplying a signal to move said upper surface blown flap aft of said inoperative engine to an angle of extension more closely corresponding to the angle extension of said conventional flap located outboard of said upper surface blown flap being extended whenever said difference exceeds a predetermined amount.

23. The method of claim 8 wherein said step of automatically retracting said conventional slotted flaps located in the wing of said aircraft not including said inoperative engine includes the steps of:

detecting the forward velocity of STOL aircraft;

automatically retracting said slotted flaps by a predetermined amount when said forward velocity is less than a predetermined velocity;

maintaining said slotted flaps at a fully extended position when said forward velocity is greater than a second predetermined velocity; and automatically retracting said slotted flap by an amount linearly related to the difference between said aircraft forward velocity and said second predetermined velocity when said aircraft forward velocity is greater than said first predetermined velocity and less than said second predetermined velocity.

* * * * *

UNITED STATES PATENT AND TRADEMARK OFFICE
CERTIFICATE OF CORRECTION

PATENT NO. : 4,106,730

DATED : August 15, 1978

INVENTOR(S) : Robert E. Spitzer et al.

It is certified that error appears in the above-identified patent and that said Letters Patent are hereby corrected as shown below:

Column 6, line 49, "and" third occurrence should be -- any --.

Column 7, line 5, "slaps" should be --flaps--.

Column 7, line 68, "fact" should be --fail--.

Signed and Sealed this

Thirteenth Day of March 1979

[SEAL]

Attest:

RUTH C. MASON
Attesting Officer

DONALD W. BANNER
Commissioner of Patents and Trademarks